March 28, 1967 E. B. LOPKER 3,311,307
FLUIDIZED BEDS
Filed Dec. 30, 1964
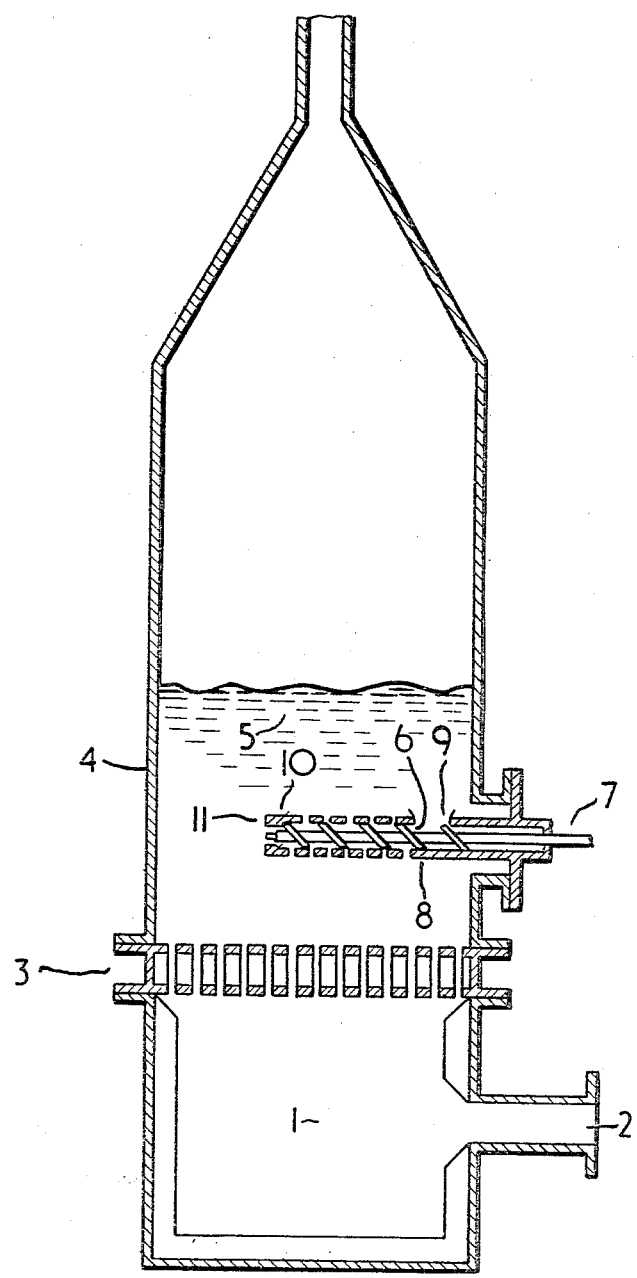

3,311,307
FLUIDIZED BEDS
Edwin Burton Lopker, Fort Lauderdale, Fla., assignor to Electric Reduction Company of Canada, Ltd., Toronto, Ontario, Canada, a corporation of Canada
Filed Dec. 30, 1964, Ser. No. 422,203
Claims priority, application Great Britain, Jan. 10, 1964, 1,170/64
9 Claims. (Cl. 241—16)

This invention relates to improvements in fluidized beds and in particular to a method and apparatus for reducing or preventing agglomeration of the particles constituting a fluidized bed.

Fluidized beds of fine particles have been used in a wide range of industrial processes. They are of particular value for reactions of solids with gases and for the heating of finely divided solids.

A serious limitation of fluidized beds is the tendency in certain processes for the average size of the particles to increase until the bed no longer has sufficient fine particles to support stable and satisfactory fluidization. For example, fluidized beds could have found wider application in the drying of materials, but for the tendency of certain moist particles to adhere to one another and form agglomerates, which can no longer be supported by the fluidizing gas stream.

It is known that the particles of a fluidized bed tend to decrease in size during the operation of the bed owing to attrition, and it has been proposed to accelerate this action by means of jets of gas introduced into the bed. The present invention is concerned with the opposite tendency of certain materials to agglomerate. This tendency cannot always be overcome by the known methods for accelerating attrition.

We have now found that it is possible to reduce the tendency for the efficiency of a fluidized bed of sticky particles to be impaired by an increase of the size of the particles of the bed during operation by subjecting the particles repeatedly to the action of a mechanical grinder.

The invention accordingly consists in a method of treating agglomerative solid material in a fluidized bed, which comprises repeatedly subjecting the material constituting the bed to the action of a mechanical grinder.

In another aspect the invention consists in apparatus for carrying out the said method, which comprises a fluidized bed reactor (for example a vessel divided by a perforated place into a wind box and a container for the fluidized bed), and a grinding mechanism which is preferably situated in the space occupied by the bed.

The invention further comprises a modification of the said apparatus in which the grinding mechanism is inserted in a duct outside the confines of the fluidized bed through which the particles of the bed are caused to flow.

Thus, material may be withdrawn from the bed, ground and then returned to the bed, but where such an external grinding system would be inconvenient, it can be avoided by installing the grinder within the bed itself.

In this specification "grinding" means rubbing or crushing between two solid surfaces moving relatively to one another.

A form of grinder particularly suitable for incorporation in a fluidized bed comprises a worm screw mounted coaxially in a tubular housing which may have perforated sides, the said housing having an opening at one end, and terminating in a perforated disc at the other. The screw is rotated and forces material entering the housing against the perforated disc. Any particle too large to pass through the holes will be crushed until it has been reduced to the requisite size.

The device makes use of a property of fluidized beds, namely that the particles constituting them migrate freely and at random through the bed. This random migration, augmented by the stirring action of the grinder, may ensure that all the material of the bed passes through the grinder sufficiently frequently to reduce or prevent local agglomeration.

Other methods of performing the invention include the incorporation within the bed of small hard objects such as ball bearings whose weight is such that they are not supported in permanent fluidization but remain in the proximity of the distribution plate, continuously agitated by the fluidizing gases, and thus breaking up any agglomerations large enough to be precipitated from the bed. This method may advantageously be combined with the worm grinder described in the last two preceding paragraphs.

The invention is not limited to any particular type of grinder or of fluid bed reactor, nor is it limited to any particular industrial application. It has, however, been found to be of special value for drying solutions of sodium orthophosphates, either to make anhydrous sodium orthophosphates, or to make condensed sodium phosphates formed when one or more anhydrous orthophosphates react at elevated temperatures.

One form of apparatus according to the invention is ilustrated in the accompanying drawing.

The apparatus consists of a windbox 1, provided with an inlet for fluidizing gases 2, and separated by a distribution plate 3 from a container 4 for the fluidized bed 5. Immersed in the bed 5 is a worm screw 6 whose axis is a rotatable shaft 7, which may be driven by a motor not shown. The screw 6 is mounted in the perforated tubular housing 8 which is provided with an opening 9. The end of the housing 8 which lies within the bed, is covered by a perforated disc 10 wich is fixed to the housing. Beyond and lying parallel to the disc 10 is a perforated scraper disc 11 which is fixed at its centre to one end of the shaft 7, which projects through the centre of the disc 10.

When the apparatus is in operation, any material of the bed 5 which has entered the housing 8 through the opening 9 is forced against the perforated plate 10 until it has been ground sufficiently finely to pass through the holes. Material extruded through the perforated plate 10 is further crushed by the action of the scraper.

Alternatively a worm grinder may be mounted vertically with its opening at the centre of the distribution place, the shaft of the worm screw being attached to scraper blades which are rotated so as to scrape agglomerated material from the distribution plate and gather it inwards to the open end of the grinder.

What is claimed is:
1. The method for treating agglomerative materials in a fluidized bed which comprises suspending particles of said material in a gaseous stream and mechanically grinding a portion of said particles between solid surfaces.
2. The process of claim 1, wherein said particles are mechanically ground in a mechanical grinder which acts within the fluidized bed.
3. The process of claim 2, wherein said mechanical grinder grinds by crushing particles against the perforated plate by the rotation of a worm screw.
4. The process of claim 1 wherein a portion of said particles from said fluidized bed are passed to a mechanical grinder located outside of said bed, are ground in said mechanical grinder, and are then returned to said fluidized bed.
5. The process for heating particles of sodium orthophosphate in a fluidized bed comprising suspending particles of said orthophosphate in a hot gaseous stream and subjecting said particles to mechanical grinding by passing a portion of said particles through a mechanical grinder located within said fluidized bed.

6. The process of claim 5 wherein said mechanical grinder crushes particles against a perforated plate by the rotation of a worm screw.

7. Apparatus for treating particles of agglomerative materials in a fluidized bed comprising a fluidized bed reactor, a mechanical grinder, and means for passing particles of agglomerative material which is treated in said fluidized bed reactor through said mechanical grinder and means for returning the ground particles to said fluidized bed reactor.

8. The apparatus of claim 7 wherein said mechanical grinder comprises a worm screw rotatably mounted in a perforated housing of circular cross-section which is provided with a means of access to said worm screw for the particles from said fluidized bed.

9. The apparatus of claim 8 wherein said mechanical grinder is situated within said fluidized bed reactor.

References Cited by the Examiner

UNITED STATES PATENTS

| | | | |
|---|---|---|---|
| 2,716,086 | 8/1955 | Schmidt et al. | 241—39 |
| 3,246,756 | 4/1966 | Binnix | 209—475 |

WILLIAM W. DYER JR., *Primary Examiner.*

G. DOST, *Assistant Examiner.*